(12) United States Patent
Toyoda (10) Patent No.: US 10,785,484 B2
(45) Date of Patent: Sep. 22, 2020

(54) MOTION VECTOR CALCULATION METHOD, INFORMATION PROCESSING APPARATUS, RECORDING MEDIUM RECORDING MOTION VECTOR CALCULATION PROGRAM

(71) Applicant: FUJITSU LIMITED, Kawasaki-shi, Kanagawa (JP)

(72) Inventor: Yuushi Toyoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 16/143,581

(22) Filed: Sep. 27, 2018

(65) Prior Publication Data

US 2019/0104313 A1 Apr. 4, 2019

(30) Foreign Application Priority Data

Oct. 2, 2017 (JP) ................................. 2017-192378

(51) Int. Cl.
| | |
|---|---|
| *H04N 19/139* | (2014.01) |
| *H04N 19/176* | (2014.01) |
| *H04N 19/117* | (2014.01) |
| *H04N 19/36* | (2014.01) |
| *H04N 19/513* | (2014.01) |
| *H04N 19/53* | (2014.01) |

(52) U.S. Cl.
CPC ......... *H04N 19/139* (2014.11); *H04N 19/117* (2014.11); *H04N 19/176* (2014.11); *H04N 19/36* (2014.11); *H04N 19/521* (2014.11); *H04N 19/53* (2014.11)

(58) Field of Classification Search
CPC .. H04N 19/139; H04N 19/117; H04N 19/176; H04N 19/36
USPC .................................................. 375/240.16
See application file for complete search history.

(56) References Cited

U.S. PATENT DOCUMENTS

2009/0285301 A1 11/2009 Kurata

FOREIGN PATENT DOCUMENTS

| JP | 08-195956 | 7/1996 |
|---|---|---|
| JP | 2009-055410 | 3/2009 |
| JP | 2009-278578 | 11/2009 |

*Primary Examiner* — Nguyen T Truong
(74) *Attorney, Agent, or Firm* — Fujitsu Patent Center (57) ABSTRACT

A method includes generating resolution images corresponding to the resolutions from each of a target image which is an image frame, included in a moving image or a still image group photographed continuously, of a processing target among the image frames and a processing target image photographed before the target image, executing block matching between a resolution image of the target image and a resolution image of the processing target image for each of the resolutions, calculating a plurality of motion vector candidates corresponding to the respective resolutions for each pixel of the target image, evaluating reliability of the plurality of motion vector candidates based on an evaluation index using noise characteristics related to pixel areas of a start point and an end point of each of the plurality of motion vector candidates for each pixel of the target image, and calculating a final motion vector.

15 Claims, 10 Drawing Sheets

FIG. 10

MOTION VECTOR CALCULATION METHOD, INFORMATION PROCESSING APPARATUS, RECORDING MEDIUM RECORDING MOTION VECTOR CALCULATION PROGRAM

CROSS-REFERENCE TO RELATED APPLICATION

This application is based upon and claims the benefit of priority of the prior Japanese Patent Application No. 2017-192378, filed on Oct. 2, 2017, the entire contents of which are incorporated herein by reference.

FIELD

The embodiment discussed herein is related to a motion vector calculation method, an information processing apparatus, and a recording medium recording a motion vector calculation program.

BACKGROUND

A small camera device such as a smartphone is widely spread.

Related art is disclosed in Japanese Laid-open Patent Publication No. 2009-278578, Japanese Laid-open Patent Publication No. 8-195956, or Japanese Laid-open Patent Publication No. 2009-55410.

SUMMARY

According to an aspect of the embodiments, a motion vector calculation method for calculating a motion vector of a pixel between image frames included in a moving image or a still image group photographed continuously, includes: generating, by a computer, a plurality of resolution images corresponding to a plurality of resolutions, respectively, from each of a target image which is an image frame of a processing target among the image frames and a processing target image which is an image frame photographed before the target image, executing block matching between a resolution image of the target image and a resolution image of the processing target image for each of the resolutions, calculating a plurality of motion vector candidates corresponding to the respective resolutions for each pixel of the target image, evaluating reliability of the plurality of motion vector candidates based on an evaluation index using noise characteristics related to pixel areas of a start point and an end point of each of the plurality of motion vector candidates for each pixel of the target image, and calculating a final motion vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A small camera device such as a smartphone is widely spread. However, a small sensor has a small light receiving area and has much noise particularly, for example, in a low illuminance environment. In order to realize a high noise removal effect, there is a technique of performing an addition average on pixel values of pixels in a time axis direction. However, if a positional deviation caused by change with time is not accurately corrected, multiple copying, blurring, or the like occurs. In order to accurately correct a positional deviation caused by change with time, even in a scene with excessive noise particularly, for example, in a dark place, it is desirable to accurately calculate a motion vector between frame images photographed temporally adjacent to each other and to calculate an addition average.

A motion vector is used for various purposes such as autofocus (AF) and high dynamic range (HDR) image processing in addition to a purpose of accurately correcting a positional deviation caused by change with time in order to remove noise. For this reason, accurate calculation of a motion vector is required for various purposes of use.

As a technique for calculating a motion vector, the following technique is known (for example, Japanese Laid-open Patent Publication No. 2009-278578). In this technique, a local motion vector is calculated by block matching with a predetermined block size. In this block matching, a block having the smallest sum of absolute difference (SAD) is searched for. Next, some local motion vectors with high reliability (with significantly small SAD) are averaged, and a global motion vector is thereby calculated. Then, reliability of each of the local vector and the global vector is evaluated, and either one of the vectors is adopted. As a method for evaluating reliability of each of the local motion vector and the global motion vector, basically, SAD with a target block is used. However, an offset is given to an evaluation value of the global motion vector, and if a difference in evaluation value is such a small difference as caused by noise, the global motion vector tends to be used.

However, the above-described technique performs block matching with a fixed block size with respect to an original image size and an evaluation function only with SAD, and therefore is strongly affected by noise in a place where no characteristic constituent object is present, for example, in a flat portion. As a result, a calculated motion vector is inaccurate.

In addition, the above-described technique performs block matching with a fixed block size, and therefore cannot deal with objects of various scales, and a calculated motion vector is inaccurate.

Therefore, a motion vector caused by change with time may be calculated accurately even in a scene with excessive noise such as a dark place.

Hereinafter, an embodiment for carrying out the present embodiments will be described in detail with reference to the drawings. In the present embodiment, a plurality of motion vector candidates having different block reference sizes is calculated in advance with a plurality of resolution images (or block sizes). Then, by evaluating reliability of each of the motion vector candidates using the matching degree of the plurality of motion vector candidates, the bidirectional matching degree, and an evaluation index using noise characteristics related to pixel areas of a start point and an end point of each of the motion vector candidates, a final motion vector is calculated. This makes it possible to accurately calculate a motion vector (entire movement of an camera or movement of a subject) caused by change with time even in a scene with excessive noise particularly, for example, in a dark place. Then, by calculating an addition average of corresponding pixels between image frames while correcting a positional deviation caused by change with time using the motion vector calculated in this way, noise can be removed between the image frames.

Figure 1:
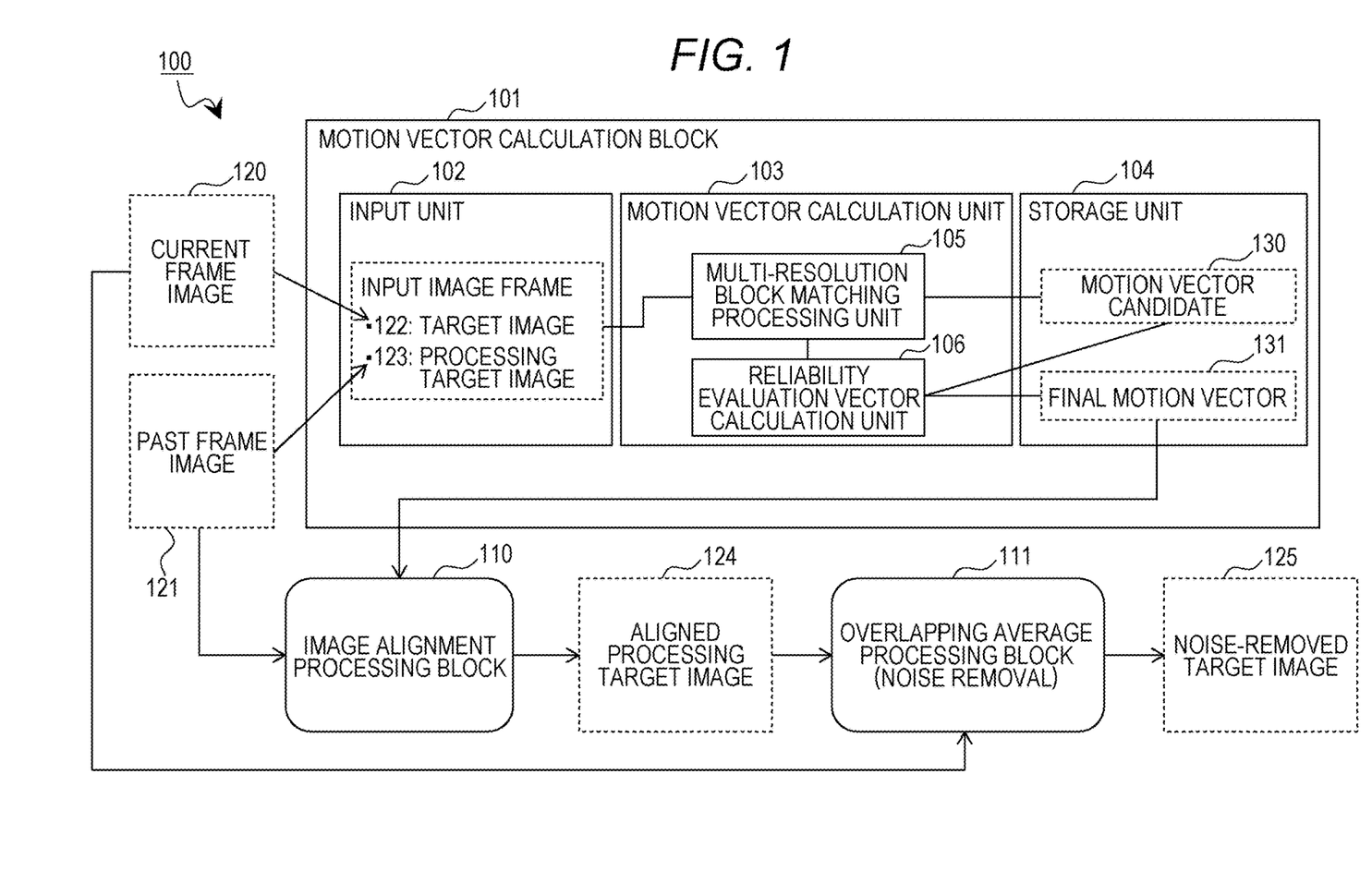
FIG. 1 is a block diagram of a motion vector calculation/noise removal device according to an embodiment.

FIG. 1 is a block diagram of a motion vector calculation/noise removal device according to the embodiment. A motion vector calculation/noise removal device 100 includes a motion vector calculation block 101, an image alignment processing block 110, and an overlapping average processing block 111.

The motion vector calculation block 101 inputs a current frame image 120 which is a photographed image at a current frame processing timing related to a moving image or a continuously photographed still image, and a past frame image 121 which is a photographed image at a past (for example, one frame before) frame processing timing. As a result, the motion vector calculation block 101 calculates a final motion vector 131 of a pixel between image frames.

By applying the final motion vector 131 calculated by the motion vector calculation block 101 for each pixel in a frame of the past frame image 121, the image alignment processing block 110 calculates an aligned processing target image 124.

By executing addition average processing (overlapping average processing) of pixel values for each pixel in the aligned past frame image 121 and the current frame image 120, the overlapping average processing block 111 calculates and outputs a noise-removed target image 125.

The motion vector calculation block 101 further includes an input unit 102, a motion vector calculation unit 103 including a multi-resolution block matching processing unit 105 and a reliability evaluation vector calculation unit 106, and a storage unit 104. The input unit 102 inputs the current frame image 120 and the past frame image 121 as a target image 122 and a processing target image 123, respectively. The target image 122 and the processing target image 123 constitute an input image frame.

In the motion vector calculation unit 103, the multi-resolution block matching processing unit 105 generates a plurality of resolution images corresponding to a plurality of resolutions, respectively, from each of the target image 122 and the processing target image 123 input by the input unit 102. Then, the multi-resolution block matching processing unit 105 executes block matching processing between a resolution image of the target image 122 and a resolution image of the processing target image 123 for each resolution. As a result, the multi-resolution block matching processing unit 105 calculates a plurality of motion vector candidates 130 corresponding to each resolution for each pixel of the target image 122, and stores the motion vector candidates 130 in the storage unit 104. Here, each of the motion vector candidates 130 is defined as follows. It is assumed that, in each pixel of a resolution image generated from the target image 122, the pixel (hereinafter referred to as "pixel A") is determined to be a pixel which has moved from a certain pixel (hereinafter referred to as "pixel B") in a resolution image generated from the processing target image 123. In this case, in the resolution image of the target image 122, a vector having a pixel position corresponding to the pixel B as a start point and the pixel A as an end point is defined as the motion vector candidate 130 corresponding to the pixel A.

In the motion vector calculation unit 103, the reliability evaluation vector calculation unit 106 inputs the plurality of motion vector candidates 130 from the storage unit 104, and evaluates reliability of the motion vector candidates 130 based on an evaluation index using noise characteristics related to pixel areas of the start point and the end point of each of the motion vector candidates 130. As a result, the reliability evaluation vector calculation unit 106 calculates the final motion vector 131 which is a motion vector selected from the plurality of motion vector candidates 130 for each pixel of the target image 122, and stores the final motion vector 131 in the storage unit 104.

Figure 2:
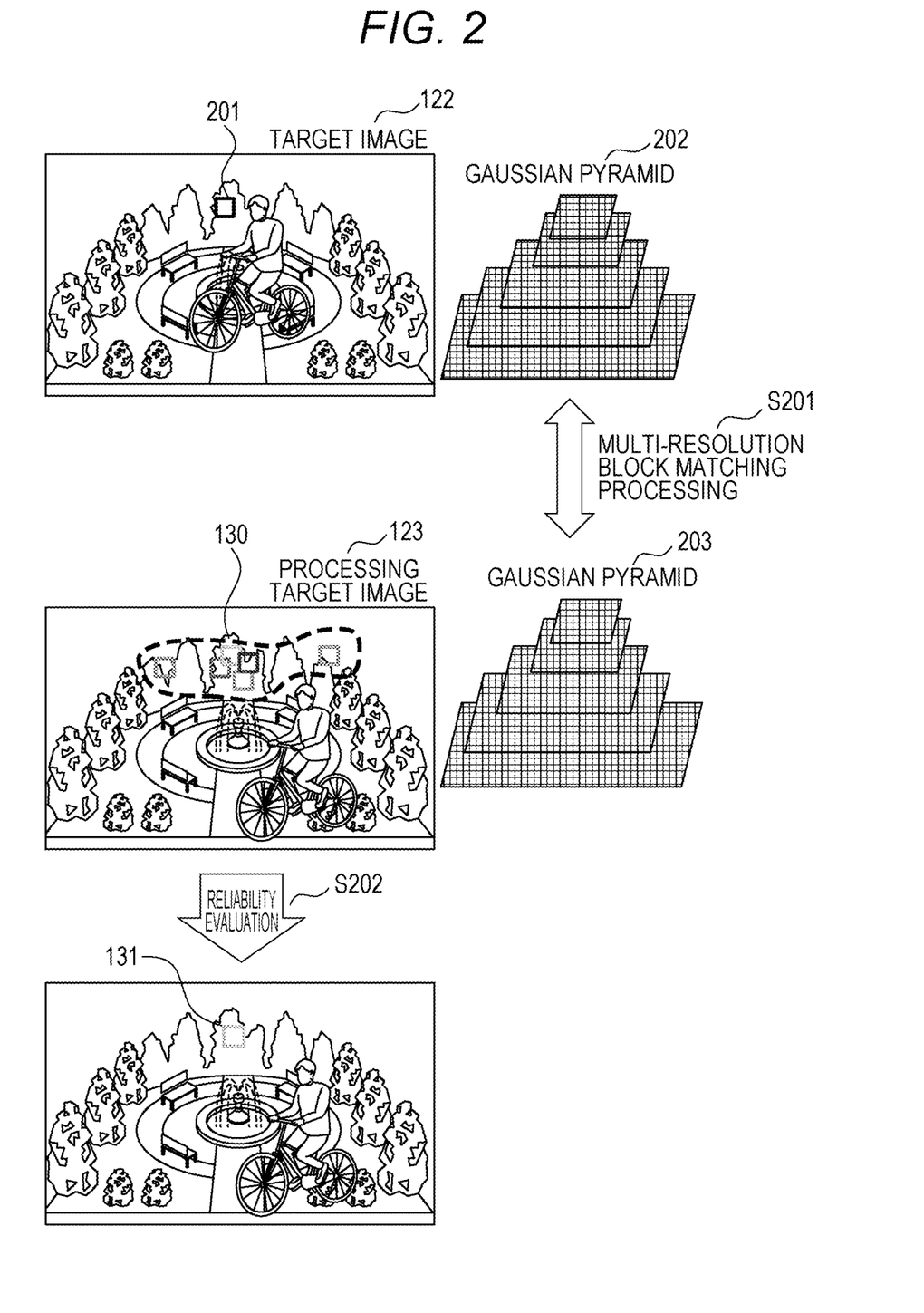
FIG. 2 is an explanatory diagram of an operation outline of a motion vector calculation block.

An operation of the motion vector calculation block 101 in the block diagram of FIG. 1 will be described below. FIG. 2 is an explanatory diagram of an operation outline of the motion vector calculation block 101. First, the multi-resolution block matching processing unit 105 in the motion vector calculation unit 103 generates a plurality of resolution images from the target image 122 and the processing target image 123 input by the input unit 102. Specifically, for example, by deleting consecutive rows and columns of a high resolution (low hierarchy) image, a low resolution (high hierarchy) image is generated. Next, to each pixel in the low resolution image, a value obtained by weighing pixel values of, for example, surrounding five pixels of each pixel in the low resolution image with Gaussian is set. That is, for example, a Gaussian smoothing filter is applied to each pixel. As a result, an image having resolution of X×Y is converted into an image having resolution of X/2×Y/2. This conversion changes the resolution X×Y to the resolution X/2×Y/2=X×Y×¼, and the resolution of an image is reduced to ¼. Processing similar to the above processing is repeatedly executed toward a high hierarchical (top) direction, that is, for example, toward a low resolution direction. By stacking up resolution images in a plurality of hierarchies ranging from a low hierarchy to a high hierarchy, a pyramidal shape is obtained. Therefore, a set of these resolution images in a plurality of hierarchies is referred to as a Gaussian pyramid (described as "Gaussian Pyramid" in the drawing). A Gaussian pyramid 202 of a target image is generated from the target image 122, and a Gaussian pyramid 203 of a processing target image is generated from the processing target image 123.

The multi-resolution block matching processing unit 105 executes block matching processing (hereinafter referred to as "multi-resolution block matching processing") between a resolution image of the Gaussian pyramid 203 of a target image and a resolution image of the Gaussian pyramid 204 of a processing target image at each resolution (S201 in FIG. 2). As a result, the multi-resolution block matching processing unit 105 calculates the plurality of motion vector candidates 130 for each pixel in a frame. For example, in FIG. 2, with respect to a target block 201 on the target image 122, the plurality of motion vector candidates 130 each having a pixel on the target image 122 corresponding to each of patches indicated by a plurality of quadrangles in an area surrounded by a broken line on the processing target image 123 as a start point is calculated. The multi-resolution block matching processing unit 105 stores the calculated plurality of motion vector candidates 130 in the storage unit 104 of FIG. 1.

Next, the reliability evaluation vector calculation unit 106 in the motion vector calculation unit 103 inputs the plurality of motion vector candidates 130 from the storage unit 104, and executes reliability evaluation processing of evaluating reliability of the motion vector candidates 130 based on an evaluation index using noise characteristics related to pixel areas of a start point and an end point of each of the motion vector candidates 130 (S202 in FIG. 2). This reliability evaluation processing includes a first step and a second step. In the first step, reliability is evaluated based on the matching degree of the calculated motion vector candidates 130. In the second step, if determination is not possible in the first step, based on the matching degree of bidirectional motion vector candidates and an evaluation index taking noise characteristics related to pixel areas of a start point and an end point of each of the motion vector candidates 130 into consideration, reliability of the plurality of motion vector candidates 130 is evaluated for each pixel in an image frame. The reliability evaluation vector calculation unit 106 calculates the final motion vector 131 evaluated to have the highest reliability for each pixel in an image frame by the reliability evaluation processing including the first step and the second step, and stores the final motion vector 131 in the storage unit 104.

Figure 3:
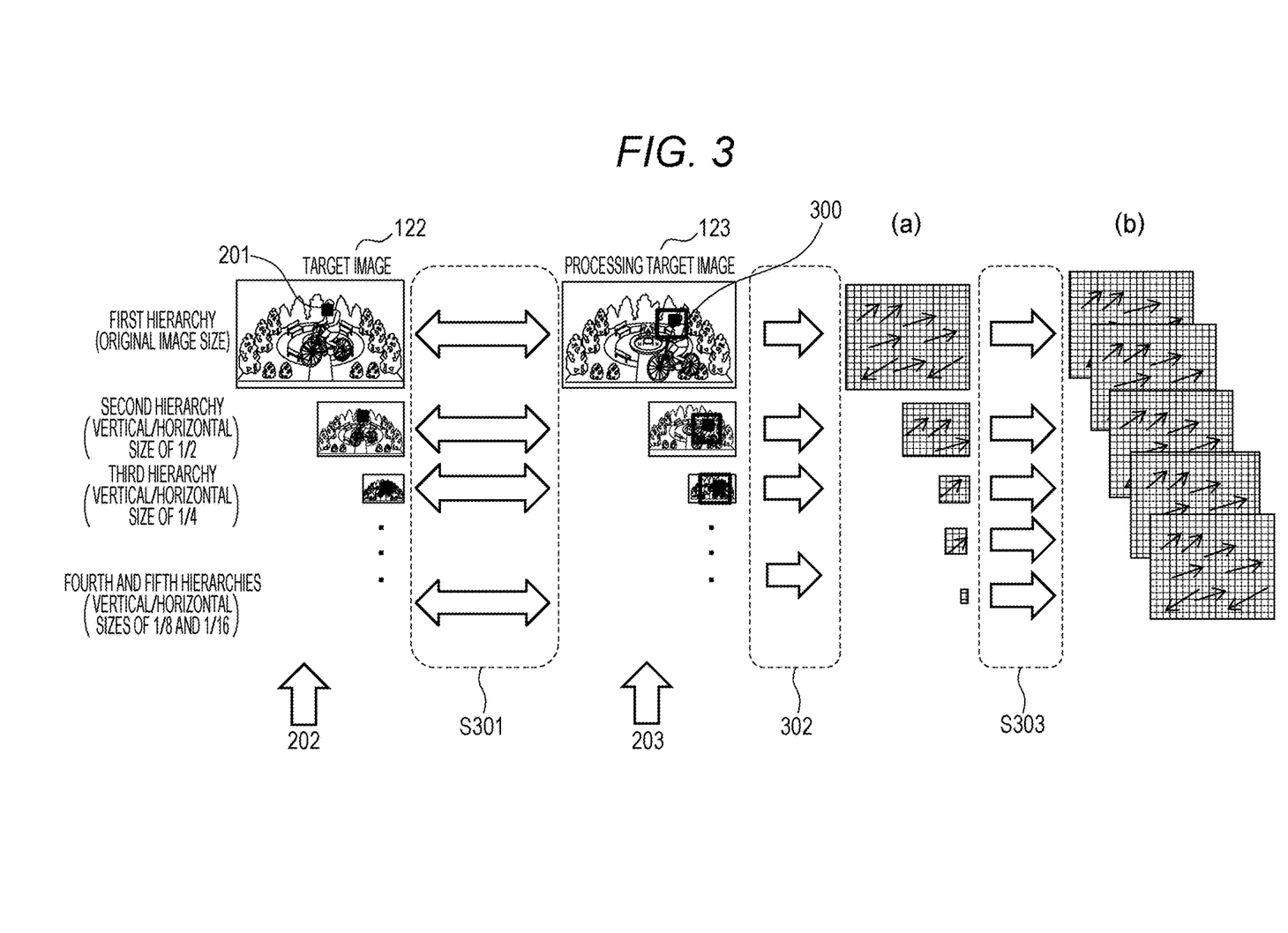
FIG. 3 is an operation explanatory diagram of multi-resolution block matching processing.

FIG. 3 is an explanatory diagram of an operation of multi-resolution block matching processing illustrated by S201 in FIG. 2, performed by the multi-resolution block matching processing unit 105 in FIG. 1. The Gaussian pyramid 202 of a target image is a set of images having resolutions obtained by reducing the resolution by ¼ with respect to an original image of the target image 122 in such a manner that a first hierarchy has the size of the original image, a second hierarchy has the vertical/horizontal size of ½ of the original image, a third hierarchy has the vertical/horizontal size of ¼ of the original image, a fourth hierarchy has the vertical/horizontal size of ⅛ of the original image, and a fifth hierarchy has the vertical/horizontal size of ¹⁄₁₆ of the original image. Similarly, the Gaussian pyramid 203 of a processing target image is a set of images having resolutions obtained by reducing the resolution by ¼ with respect to the processing target image 123 in such a manner that the set includes a first hierarchy, a second hierarchy, a third hierarchy, a fourth hierarchy, and a fifth hierarchy.

The multi-resolution block matching processing unit 105 executes block matching processing of each pixel in an image frame for every resolution images in a corresponding hierarchy in the Gaussian pyramid 202 of a target image and the Gaussian pyramid 203 of a processing target image (S301 in FIG. 3). Here, as for the target block 201 (refer to FIG. 2) centered on a pixel for which the motion vector candidate 130 is intended to be calculated in the target image 122, a patch size as the size of the target block 201 is, for example, 7×7 pixels. A search range 300 (FIG. 3) on the processing target image 123 for calculating the motion vector candidate 130 to the target block 201 is, for example, an area of 41×41 pixels including a block on each resolution image of the processing target image 123 at a position corresponding to the target block 201 on the target image 122. At this time, for example, the search range 300 in the resolution image in the second hierarchy of the processing target image 123 has an area four times the search range 300 in the resolution image (original image of the processing target image 123) in the first hierarchy in a case where the same scale is set. Similarly, regarding the search range 300 in the resolution image in each hierarchy of the processing target image 123, the motion vector candidate 130 can be searched for in a wider search range by four times with an increase in the number of hierarchy in a case where the same scale is set. In this way, by executing block matching processing in any hierarchy even to objects of various scales, the final motion vector 131 can be calculated accurately. Meanwhile, in generating the Gaussian pyramid 202 of a target image and the Gaussian pyramid 203 of a processing target image, as described above, the Gaussian smoothing filter is applied to each pixel. As a result, while blurring of each pixel is suppressed, an influence of noise is reduced at the time of calculating the motion vector candidate 130 by smoothing using a surrounding pixel. As a result of the above-described block matching processing, as indicated by S302 in FIG. 3, the motion vector candidate 130 of a corresponding image size is calculated for each pixel of a resolution image frame in the hierarchy (S302 in FIG. 3).

Next, the multi-resolution block matching processing unit 105 executes nearest neighbor enlargement processing to the motion vector candidate 130 in each of the hierarchies other than the first hierarchy (S303 in FIG. 3). In this nearest neighbor enlargement processing, the scale of each of the motion vector candidate 130 in each of the hierarchies other than the first hierarchy illustrated as (a) in FIG. 3 is enlarged to the size (original image size) in the first hierarchy as illustrated as (b) in FIG. 3. As a result, the motion vector candidates 130 each having an original image size are generated for each pixel in an image frame by the number of layers (five types). These motion vector candidates 130 are stored in the storage unit 104 in FIG. 1.

Figure 4:
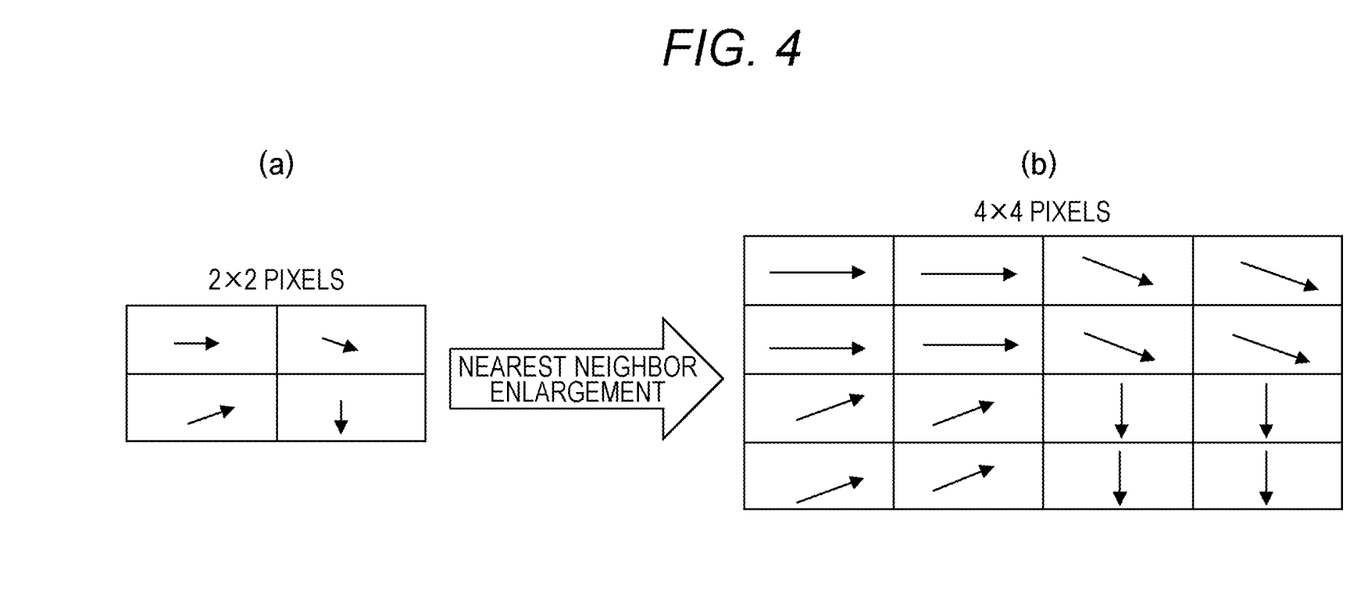
FIG. 4 is an explanatory diagram of nearest neighbor enlargement processing.

FIG. 4 is an explanatory diagram of the nearest neighbor enlargement processing. Here, for simplifying explanation, an example is illustrated in which the motion vector candidates 130 indicated by arrows in an image frame formed of 2×2 pixels illustrated in (a) in FIG. 4 are enlarged to an image frame formed of 4×4 pixels illustrated in (b) in FIG. 4. As described above, in the nearest neighbor enlargement processing from the image frame formed of 2×2 pixels to the image frame formed of 4×4 pixels, the vertical/horizontal scale of each of the motion vector candidates 130 corresponding to each pixel in the image frame formed of 2×2 pixels is doubled. For example, in a case where a 2×2 pixel value is enlarged to a 4×4 pixel value, the motion vector candidates 130 of two pixels on the right become the motion vector candidates 130 of four pixels on the right. Then, by adding pixels to the right side, the lower side, and the diagonally right lower side of each pixel (hereinafter referred to as "unenlarged pixel") in the image frame formed of 2×2 pixels in (a) in FIG. 4, an enlarged pixel having the number of pixels quadrupled is generated. Then, the motion vector candidates 130 each having the vertical/horizontal scale in the unenlarged pixel doubled are copied to each enlarged pixel having the number of pixels quadrupled. As a result, an enlarged image formed of 4×4 pixels illustrated in (b) in FIG. 4 is generated.

In the nearest neighbor enlargement processing illustrated in S303 of FIG. 3, for example, as for a resolution image in the second hierarchy, processing similar to that in FIG. 4 is executed to each pixel of the resolution image in the second hierarchy. That is, for example, by adding pixels to the right side, the lower side, and the diagonally right lower side of each pixel in the resolution image frame in the second hierarchy, a pixel having the number of pixels quadrupled and having an original image size is generated. Then, the motion vector candidates 130 each having the vertical/horizontal scale in a pixel in the second hierarchy doubled are copied to a pixel having the number of pixels quadrupled and having an original image size.

Further, as for a resolution image in the third hierarchy, by executing processing similar to that in FIG. 4 to each pixel of a resolution image in the third hierarchy, an image having the size in the second hierarchy is generated first. Then, by further executing processing similar to that in FIG. 4 to each pixel of the image having the size in the second hierarchy, an image having the original image size is generated.

Subsequently, the reliability evaluation vector calculation unit 106 selects one, for example, from five types of the motion vector candidates 130 for one pixel in the image frame, generated by the above-described processing (S301, S302, and S303 in FIG. 3) by the multi-resolution block matching processing unit 105. At this time, the reliability evaluation vector calculation unit 106 reads the motion vector candidates 130 from the storage unit 104 in FIG. 1 and executes reliability evaluation processing including the first step and the second step (S202 in FIG. 2) to the motion vector candidates 130.

Figure 5A:
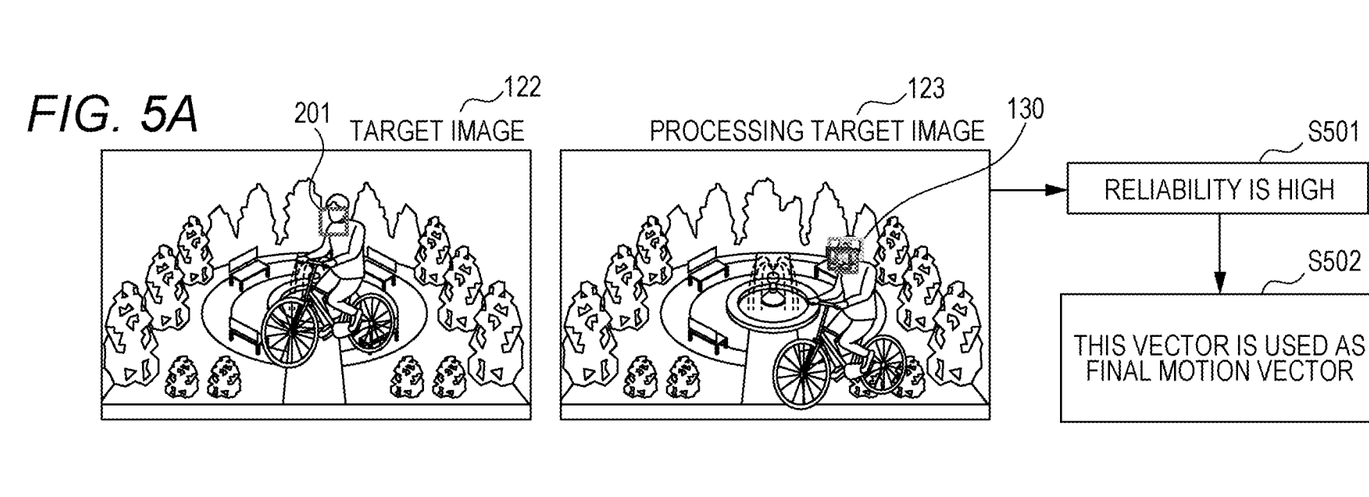
FIGS. 5A and 5B are explanatory diagrams of a first step of reliability evaluation processing.
Figure 5B:
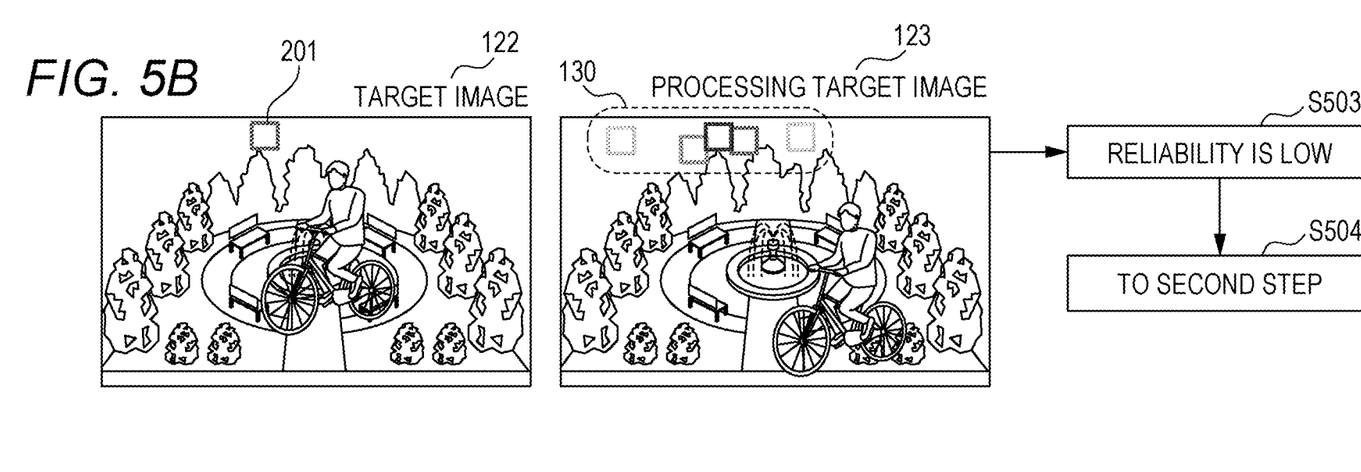

FIGS. 5A and 5B are explanatory diagrams of the first step of the reliability evaluation processing. In this first step, for each pixel in an image frame, reliability is evaluated based on the matching degree of, for example, five types of the motion vector candidates 130 read from the storage unit 104. As illustrated in FIG. 5A, with respect to the target block 201 on the target image 122, for example, among the calculated five types of motion vector candidates 130 on the processing target image 123, if the number of the motion vector candidates 130 indicating substantially the same place is equal to or larger than a predetermined threshold, it is determined that reliability is high (S501 in FIG. 5A). In this case, the reliability evaluation vector calculation unit 106 selects or calculates a representative vector among the motion vector candidates 130 in the number equal to or larger than the threshold or an average vector thereof as the final motion vector 131 with respect to the target block 201 (S502 in FIG. 5A). The final motion vector 131 is stored in the storage unit 104 in FIG. 1. [0031] Meanwhile, as illustrated in FIG. 5B, if, with respect to the target block 201 on the target image 122, for example, among the calculated five types of motion vector candidates 130 on the processing target image 123, the number of the motion vector candidates 130 indicating substantially the same place is less than the threshold, it is determined that reliability is low (S503 in FIG. 5B). In this case, the reliability evaluation vector calculation unit 106 executes the following second step of the reliability evaluation processing S202 (S504 in FIG. 5B).

In the second step, reliability of the plurality of motion vector candidates 130 is evaluated for each pixel in an image frame based on the matching degree of bidirectional motion vector candidates and an evaluation index taking noise characteristics related to pixel areas of a start point and an end point of each of the motion vector candidates 130 into consideration. Then, one final motion vector 131 evaluated to have the highest reliability is selected and stored in the storage unit 104.

Figure 6:
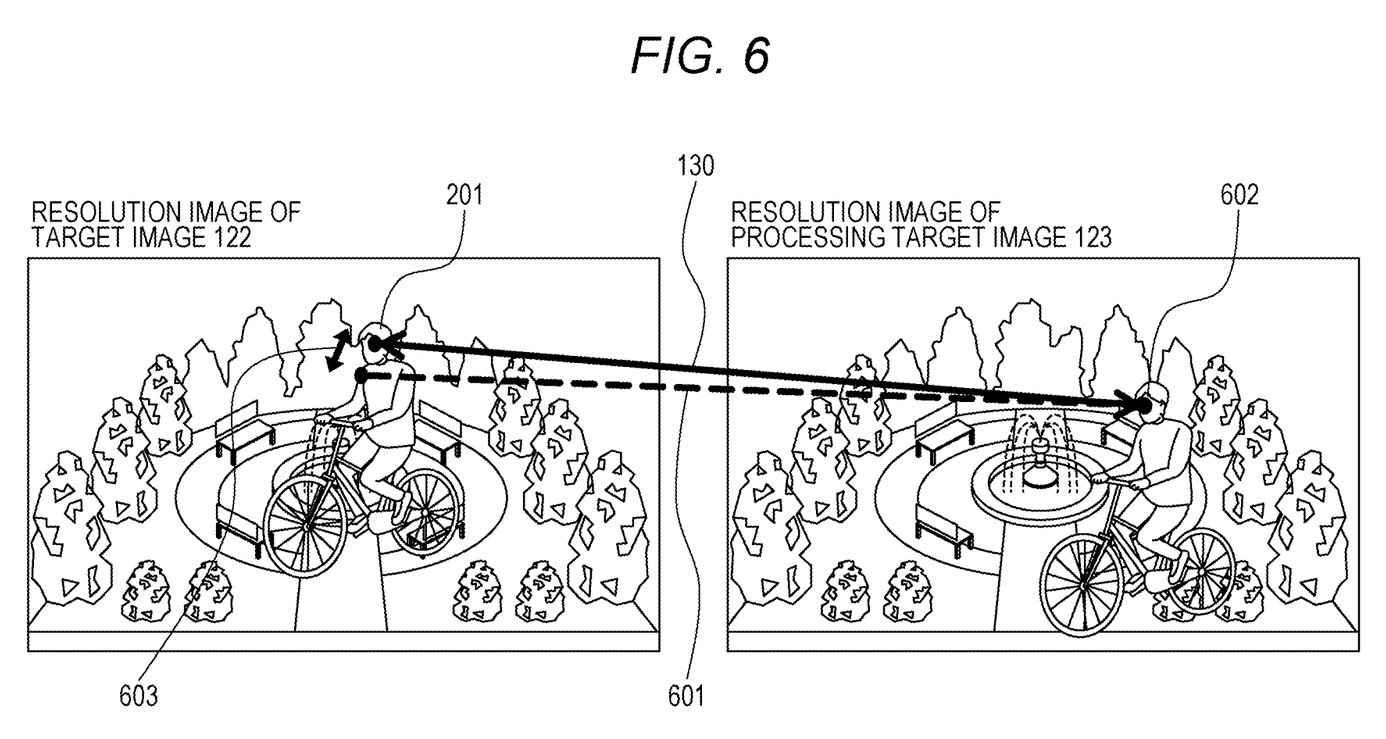
FIG. 6 is an explanatory diagram of processing of sorting out a motion vector candidate by determination of the matching degree of bidirectional motion vector candidates in a second step of reliability evaluation processing.

FIG. 6 is an explanatory diagram of processing of sorting out the motion vector candidates 130 by determination of the matching degree of bidirectional motion vector candidates in the second step of the reliability evaluation processing. As defined above, as for the motion vector candidates 130, a start point pixel and an end point pixel (pixel corresponding to the target block 201) of each of the motion vector candidates 130 are defined on the target image 122, and the start point pixel corresponds to a pixel of a movement source on the processing target image 123. Therefore, in FIG. 6, in order to facilitate understanding, the motion vector candidate 130 is indicated as a vector directed from a pixel on a resolution image of the processing target image 123 toward the target block 201 on a resolution image of the target image 122. In FIG. 6, first, for each hierarchy described with reference to FIG. 3, in addition to the motion vector candidate 130 in a hierarchy read from the storage unit 104, a backward motion vector candidate 601 corresponding to the motion vector candidate 130 in the hierarchy is further calculated. Specifically, for example, in calculating the backward motion vector candidate 601, for each hierarchy, a position on the resolution image of the processing target image 123 corresponding to the start point pixel of each of the motion vector candidates 130 directed toward the target block 201 on the resolution image of the target image 122 is set as a new target block 602. Next, conversely, movement from the resolution image of the target image 122 to the target block 602 on the resolution image of the processing target image 123 is assumed. Then, a motion vector candidate based on the assumed movement corresponding to the target block 602 on the resolution image of the processing target image 123 is calculated, and this motion vector candidate is set as the backward motion vector candidate 601. Processing of calculating the backward motion vector candidate 601 is executed by activating the multi-resolution block matching processing unit 105 in FIG. 1 similarly to the processing of calculating the motion vector candidates 130.

Next, the matching degree of the bidirectional motion vector candidates including the motion vector candidate 130 and the backward motion vector candidate 601 is determined. Here, the motion vector candidate 130 is represented by $V_{ij}$, and the backward motion vector candidate 601 is represented by $V_{ji}$. As expressed by the following formula (1), by determining whether a distance (norm) 603 between $V_{ij}$ and a vector $-V_{ji}$ having a direction opposite to $V_{ji}$ is smaller than a predetermined threshold δ, the matching degree of the bidirectional motion vector candidates is determined. This determination formula means how much the backward motion vector candidate 601 overlaps with the original motion vector candidate 130 when the direction of the backward motion vector candidate 601 is reversed.

[Numerical Formula 1]

$$\|V_{ij}-(-V_{ji})\|=\|V_{ij}+V_{ji}\|<\delta \quad (1)$$

The reliability evaluation vector calculation unit 106 adopts the motion vector candidate 130 in a hierarchy because of having high reliability when the determination in the above formula (1) is satisfied, that is, for example, when the matching degree of bidirectional motion vector candidates is high, further in other words, for example, when the distance 603 in FIG. 6 is short. Meanwhile, the reliability evaluation vector calculation unit 106 does not adopt the motion vector candidate 130 because of not having high reliability when the determination in the above formula (1) is not satisfied.

Figure 7:
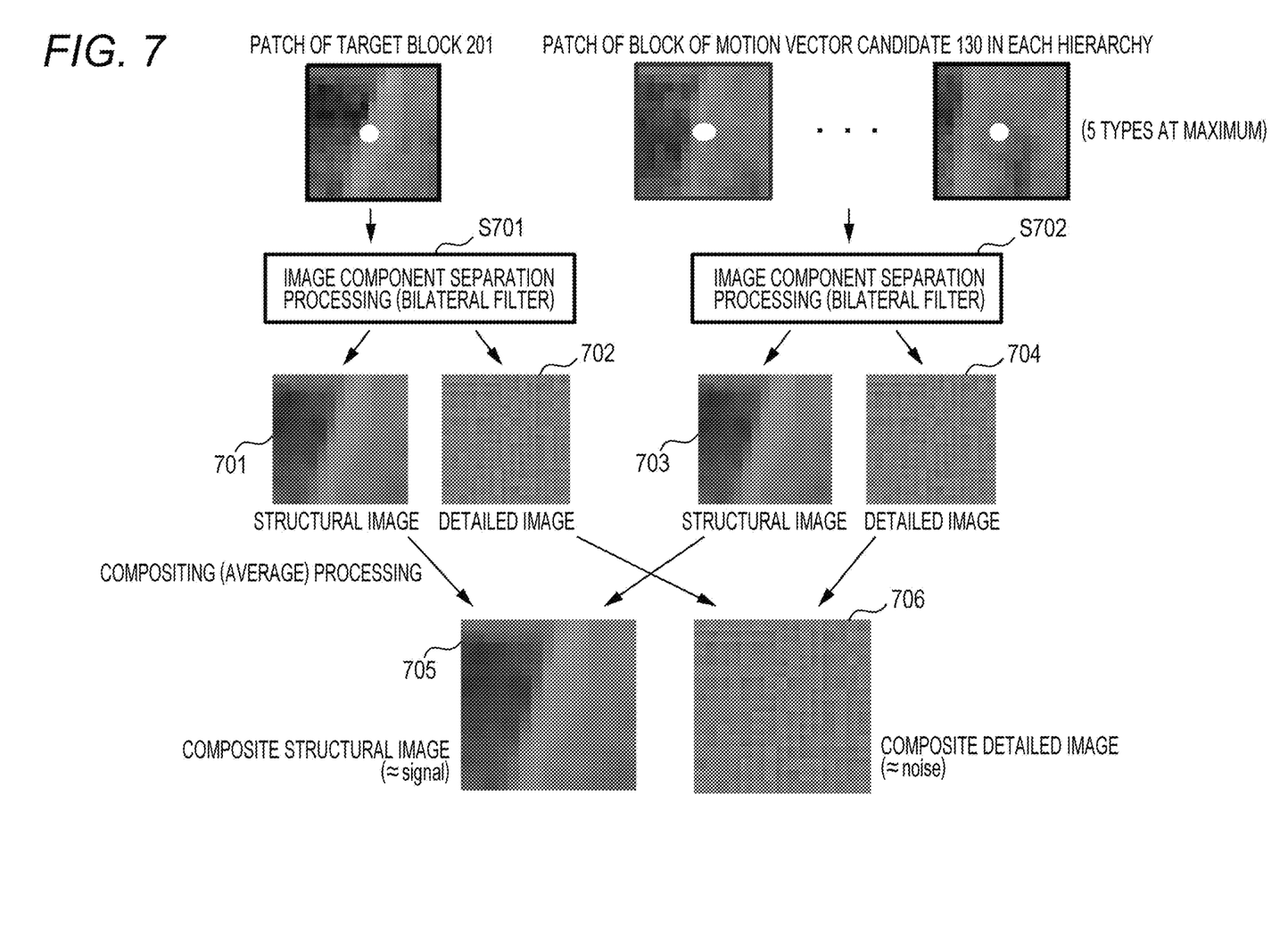
FIG. 7 is an explanatory diagram of processing of selecting a final motion vector based on an evaluation index taking noise characteristics in the second step of the reliability evaluation processing into consideration.

FIG. 7 is an explanatory diagram of processing of selecting the final motion vector 131 (refer to FIG. 1) based on an evaluation index taking noise characteristics related to pixel areas of a start point and an end point of each of the motion vector candidates 130 in the second step of the reliability evaluation processing into consideration. The reliability evaluation vector calculation unit 106 executes the following processing for each pixel of an image frame using the motion vector candidate 130 in a hierarchy adopted by the determination processing of formula (1) among the motion vector candidates 130 in each of hierarchies read from the storage unit 104. To each of a patch of the target block 201 of the target image 122 and a patch of a block of the motion vector candidate 130 after the nearest neighbor enlargement processing (S303 in FIG. 3) in each hierarchy adopted in the determination processing, image component separation processing (S701 and S702) is executed using a bilateral filter. As a result, a structural image 701 including a signal component is generated from the patch of the target block 201, and a detailed image 702 including a noise component is generated from a difference between the patch of the target block 201 and the structural image 701. Similarly, a structural image 703 including a signal component is generated from a patch of a block of the motion vector candidate 130 in one hierarchy, and a detailed image 704 including a noise component is generated from a difference between the patch of the block of the motion vector candidate 130 and the structural image 703.

Next, composite processing of calculating an average for each corresponding pixel is executed to the structural image 701 of the patch of the target block 201 and the structural image 703 of the patch of the block of the motion vector candidate 130 in one hierarchy to calculate a composite structural image 705. Further, composite processing of calculating an average for each pixel is executed to the detailed image 702 of the patch of the target block 201 and the detailed image 704 of the patch of the block of the motion vector candidate 130 in one hierarchy to calculate a composite detailed image 706. The composite structural image 705 and the composite detailed image 706 correspond to a signal component (signal) and a noise component (noise), respectively.

Thereafter, the reliability evaluation vector calculation unit 106 calculates a noise variance evaluation value E in one hierarchy by the following formula (2).

$$E = \alpha |\mu_t - \mu_{bi}| + \beta \sigma_{di} \quad (2)$$

Here, $\mu_t$ represents an average value of pixel values of pixels of the structural image 701 of a patch of the target block 201, $\mu_{bi}$ represents an average value of pixel values of pixels of the composite structural image 705, and $\sigma_{di}$ represents a standard deviation (or variance) of pixel values of pixels of the composite detailed image 706. Further, $\alpha$ and $\beta$ represent coefficient parameters. Here, in a case where the motion vector candidate 130 in one hierarchy is a correct motion vector, if it is assumed that noise is spatially random, a standard deviation (or variance) of noise of the composite detailed image 706 obtained by adding and averaging noise components decreases. Further, in a case where the motion vector candidate 130 in one hierarchy is a correct motion vector, the structural image 701 of a patch of the target block 201 and the composite structural image 705 resemble each other. Therefore, an absolute value of a difference between $\mu_t$ and $\mu_{bi}$ is small. Therefore, in a case where the motion vector candidate 130 in one hierarchy is a correct motion vector, the noise variance evaluation value E calculated by the above-described formula (2) is a small value. Note that the noise variance evaluation value E may be calculated only from the second term on the right side of the above formula (2), that is, for example, only from the standard deviation (or variance) of the noise of the composite detailed image 706.

Therefore, the reliability evaluation vector calculation unit 106 executes, for each pixel of an image frame, calculation expressed by the above-described formula (2) for the motion vector candidate 130 in each hierarchy adopted in the determination processing of the above-described formula (1) to calculate each noise variance evaluation value E. Then, the reliability evaluation vector calculation unit 106 selects the motion vector candidate 130 in a hierarchy having the smallest calculated noise variance evaluation value E as the final motion vector 131.

As described above, the final motion vector 131 is calculated from the plurality of motion vector candidates 130 by multi-resolution block matching processing using the Gaussian pyramid. As a result, the final motion vector 131 can be accurately calculated for objects of various scales. Further, the final motion vector 131 corresponding to a flat portion may be relatively accurately calculated based on the motion vector candidate 130 of a resolution image of a low resolution (high hierarchy) having the wide search range 300 (FIG. 3).

Further, in the first step and the second step of the reliability evaluation processing, by evaluating reliability when the plurality of motion vector candidates 130 is selected as the final motion vector 131, even in a scene with excessive noise particularly, for example, in a dark place, it is possible to accurately calculate a motion vector that changes with time due to movement of a camera or a subject.

In addition, by executing noise removal processing based on the motion vector accurately calculated in this way, it is possible to reduce an influence of noise when objects on an image have different scales or the scale is a low resolution scale.

Figure 8:
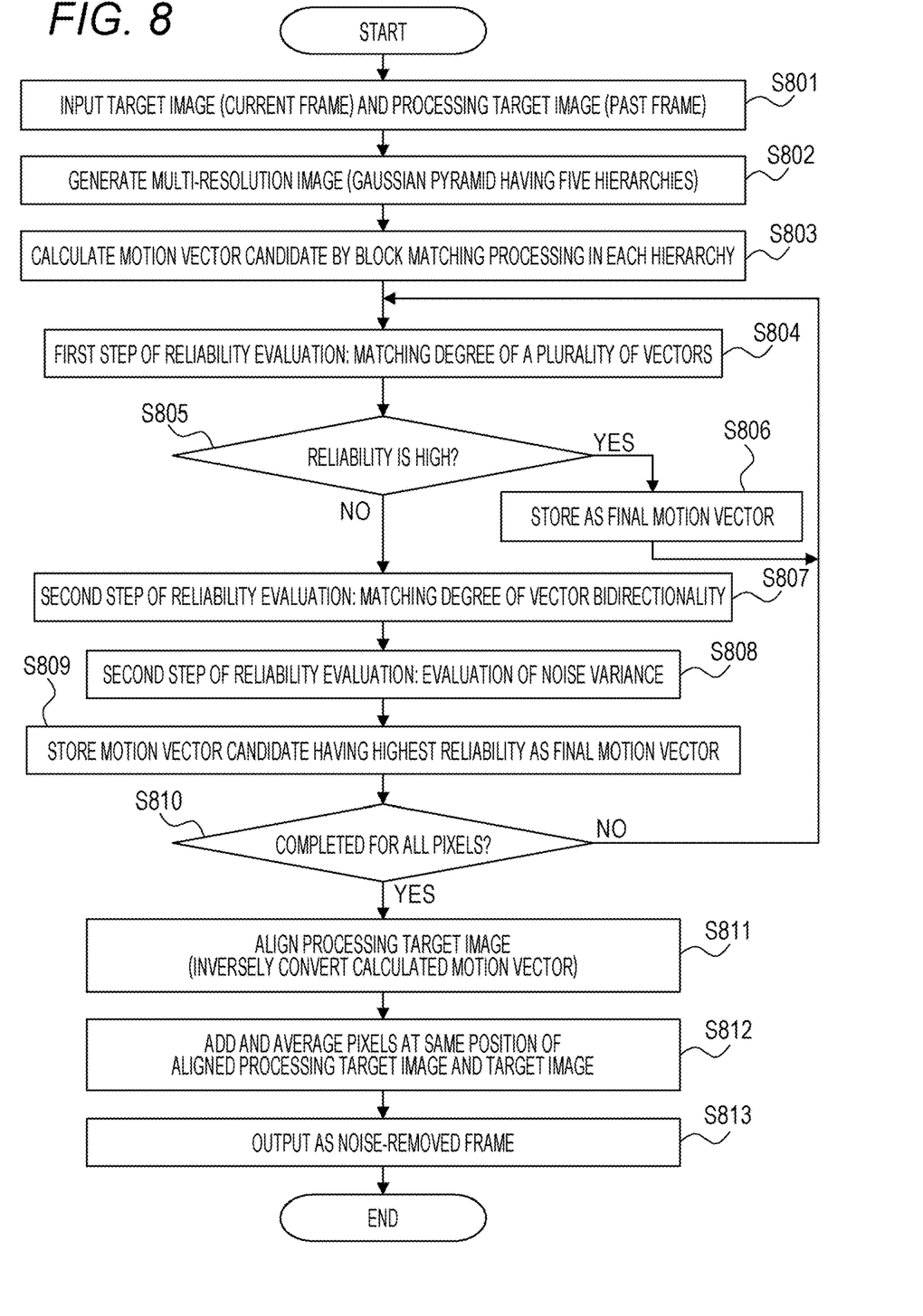
FIG. 8 is a flowchart illustrating an example of motion vector calculation/noise removal processing.

FIG. 8 is a flowchart illustrating an example of motion vector calculation/noise removal processing executed by the motion vector calculation/noise removal device 100 of FIG. 1. In the following description, each block of FIG. 1 is also referred to as occasion demands.

First, the input unit 102 inputs the current frame image 120 and the past frame image 121 (for example, an image of one frame before) as the target image 122 and the processing target image 123, respectively (step S801).

Next, the multi-resolution block matching processing unit 105 generates the Gaussian pyramid 202 of a target image and the Gaussian pyramid 203 of a processing target image, for example, each including five hierarchies described with reference to FIGS. 2 and 3 as multi-resolution images (step S802).

The multi-resolution block matching processing unit 105 executes block matching processing of each pixel in an image frame for each resolution image in a corresponding hierarchy in the Gaussian pyramid 202 of a target image and the Gaussian pyramid 203 of a processing target image. The multi-resolution block matching processing unit 105 stores, for example, every five types of the motion vector candidates 130 (corresponding to (b) in FIG. 3) generated for each pixel in the image frame in the storage unit 104 (step S803). The processing corresponds to the processing described in S301, S302, and S303 in FIG. 3.

Incidentally, in step S803, the multi-resolution block matching processing unit 105 also executes processing of calculating the backward motion vector candidate 601 described with reference to FIG. 6 for each pixel in the image frame, and stores the backward motion vector candidate 601 thus generated in the storage unit 104. [0050] Next, the multi-resolution block matching processing unit 105 and the reliability evaluation vector calculation unit 106 select one pixel at a time from the target image 122 and repeat a series of processing in steps S804 to S809 until it is determined that processing of all the pixels is completed in step S810. Hereinafter, a pixel sequentially selected is referred to as a "target pixel".

In processing in steps S804 to S809, first, the reliability evaluation vector calculation unit 106 executes the first step of the reliability evaluation processing described with reference to FIGS. 5A and 5B to a target pixel. The reliability evaluation vector calculation unit 106 determines the matching degree of, for example, five types of the motion vector candidates 130 with respect to the target pixel read from the storage unit 104 (step S804).

Next, as a result of the processing in step S804, the reliability evaluation vector calculation unit 106 determines whether reliability of, for example, five types of the motion vector candidates 130 calculated for the target pixel is high (step S805). Here, as described with reference to FIG. 5A, with respect to the target block 201 corresponding to the target pixel on the target image 122, it is determined whether the number of the motion vector candidates 130 indicating substantially the same place, for example, among five types of the motion vector candidates 130 on the processing target image 123 is equal to or larger than a predetermined threshold.

If determination in step S805 is YES, the reliability evaluation vector calculation unit 106 selects or calculates a representative vector among the motion vector candidates 130 in the number equal to or larger than the threshold or an average vector thereof for the target pixel. Then, the reliability evaluation vector calculation unit 106 stores the selected or calculated vector in the storage unit 104 as the final motion vector 131 corresponding to the target pixel (step S806). Thereafter, the processing returns to the processing in step S804, and processing to a subsequent pixel in the target image 122 is executed.

If determination in step S805 is NO, the reliability evaluation vector calculation unit 106 executes processing of sorting out the motion vector candidate 130 by determination of the matching degree of bidirectional motion vector candidates in the second step of the reliability evaluation processing, described with reference to FIG. 6 (step S807). Here, for example, for every five types of hierarchies, the motion vector candidate 130 calculated in step S803 and the backward motion vector candidate 601 corresponding thereto are read from the storage unit 104. Then, the matching degree of the bidirectional motion vector candidates including the motion vector candidate 130 and the backward motion vector candidate 601 is determined by the above-described formula (1). As a result, only the motion vector candidate 130 in a hierarchy satisfying this matching degree is selected.

Next, the reliability evaluation vector calculation unit 106 executes processing of calculating the noise variance evaluation value E taking noise characteristics related to pixel areas of a start point and an end point of each of the motion vector candidates 130 in the second step of the reliability evaluation processing, described with reference to FIG. 7, into consideration (step S808). Details of this processing will be described below with reference to the flowchart of FIG. 8. [0056] Finally, the reliability evaluation vector calculation unit 106 selects the motion vector candidate 130 in a hierarchy in which the noise variance evaluation value E calculated in step S808 is the smallest as the final motion vector 131, and stores the final motion vector 131 in the storage unit 104 (step S809).

Thereafter, it is determined whether processing for all the pixels in the target image 122 has been completed (step S810). If this determination is NO, the processing returns to the processing in step S804, and processing for a subsequent pixel in the target image 122 is executed.

If the final motion vector 131 is calculated for all the pixels in the target image 122 and determination in step S810 is YES, the image alignment processing block 110 executes subsequent processing. The image alignment processing block 110 reads the final motion vector 131 calculated in the above-described series of processing from the storage unit 104 for each pixel in a frame of the processing target image 123 (past frame image 121), and inversely converts and applies the final motion vector 131. When one pixel of the processing target image 123 is moved by the length of the final motion vector 131 calculated for the pixel, the pixel becomes a pixel of the target image 122. Therefore, in order to calculate a pixel on the processing target image 123 corresponding to a current pixel of the target image 122, by moving the current pixel of the target image 122 with the direction of the final motion vector 131 reversed, a pixel of a movement source of the processing target image 123 may be calculated. This processing is the above-described processing of "inversely converting and applying the final motion vector 131". Further, the processing of calculating a pixel on the processing target image 123 corresponding to a pixel on the target image 122 in this way is referred to as "alignment" processing. The image alignment processing block 110 executes the above-described alignment processing and thereby calculates the processing target image 124 aligned with respect to the target image 122 (step S811).

Thereafter, the overlapping average processing block 111 executes addition average processing (overlapping average processing) for each of the aligned pixels with the aligned processing target image 124 and the target image 122 (current frame image 120) (step S812). If it is assumed that the final motion vector 131 is correctly calculated for each pixel in a frame and that random noise is present between the target image 122 and the processing target image 123, by executing the addition average processing between pixels aligned as described above, noise may be removed.

The overlapping average processing block 111 outputs each pixel of a processing result in step S812 as the noise-removed target image 125 (step S813). By the above processing, the motion vector calculation/noise removal processing to the input current frame image 120 exemplified in the flowchart of FIG. 8 is completed.

Figure 9:
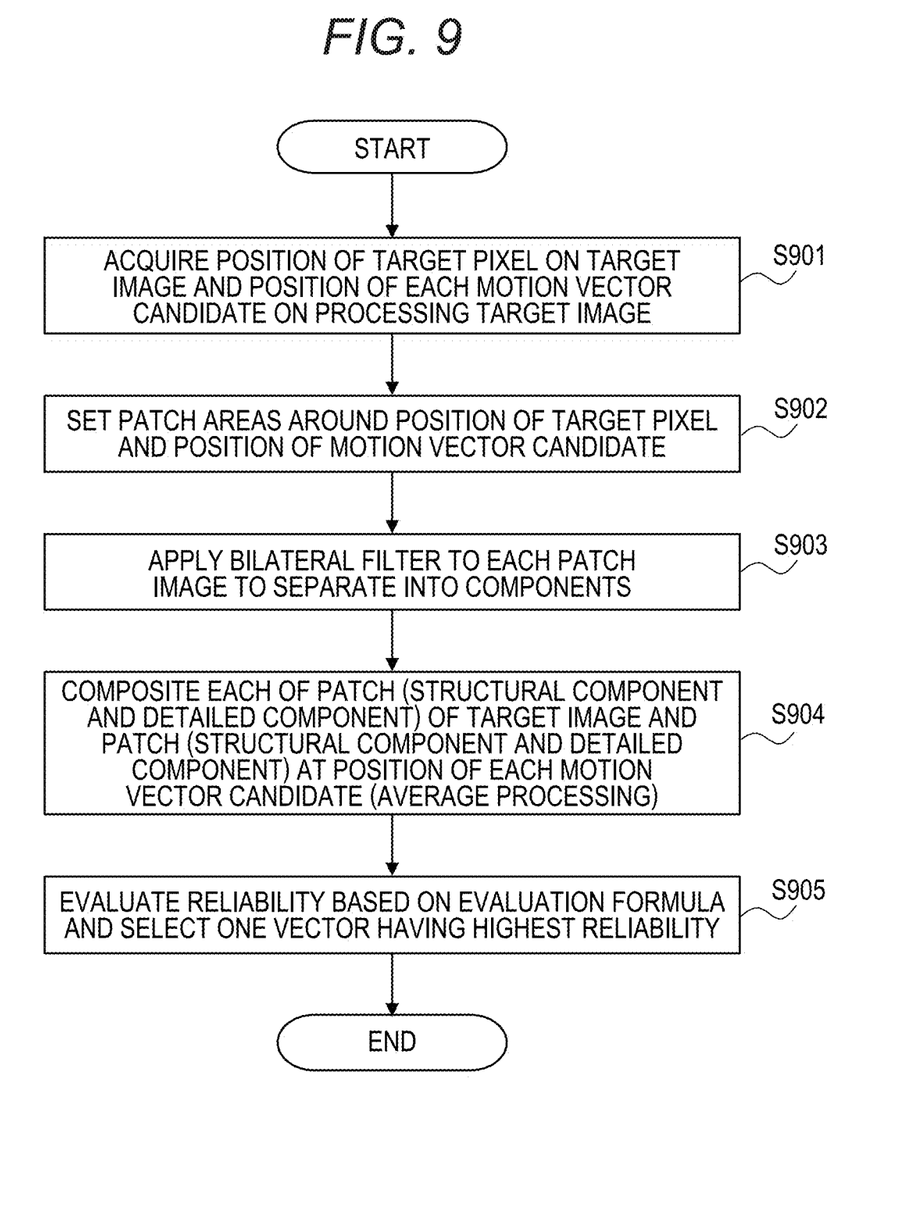
FIG. 9 is a flowchart illustrating a detailed example of processing of calculating a noise variance evaluation value E taking noise characteristics in the second step of the reliability evaluation processing into consideration.

FIG. 9 is a flowchart illustrating a detailed example of processing of calculating the noise variance evaluation value E taking noise characteristics related to pixel areas of a start point and an end point of each of the motion vector candidates 130 in the second step of the reliability evaluation processing in step S808 of FIG. 8 into consideration.

First, the reliability evaluation vector calculation unit 106 acquires the position of a target pixel on the target image 122 and the position of each of the motion vector candidates 130 in each hierarchy adopted in the determination processing in step S807 in FIG. 8 on the processing target image 123 (step S901).

Next, the reliability evaluation vector calculation unit 106 sets patch areas at the position of the target image and at the position of each of the motion vector candidates 130 in each hierarchy, which are acquired in step S901, respectively (step S902).

Next, the reliability evaluation vector calculation unit 106 applies the bilateral filter described with reference to FIG. 7 to a patch of the target block 201 of the target image 122 set in step S902 and separates the patch into the structural image 701 and the detailed image 702. Similarly, the reliability evaluation vector calculation unit 106 applies the bilateral filter to a patch of each of the motion vector candidates 130 in each hierarchy set in step S902 and separates the patch into the structural image 703 and the detailed image 704 (processing, S903).

Thereafter, as illustrated in FIG. 7, the reliability evaluation vector calculation unit 106 executes each composite processing of calculating an average for each of corresponding pixels with respect to the structural image 701 and the structural image 703 in each hierarchy and calculates the composite structural image 705 in each hierarchy. Similarly, the reliability evaluation vector calculation unit 106 executes each composite processing of calculating an average for each of corresponding pixels with respect to the detailed image 702 and the detailed image 704 in each hierarchy and calculates the composite detailed image 706 in each hierarchy (step S904).

Then, the reliability evaluation vector calculation unit 106 calculates the noise variance evaluation value E in each hierarchy with the calculation of the above-described formula (2), and selects one of the motion vector candidates 130 in a hierarchy having the smallest noise variance evaluation value E and the highest reliability as the final motion vector 131 (step S905).

Figure 10:
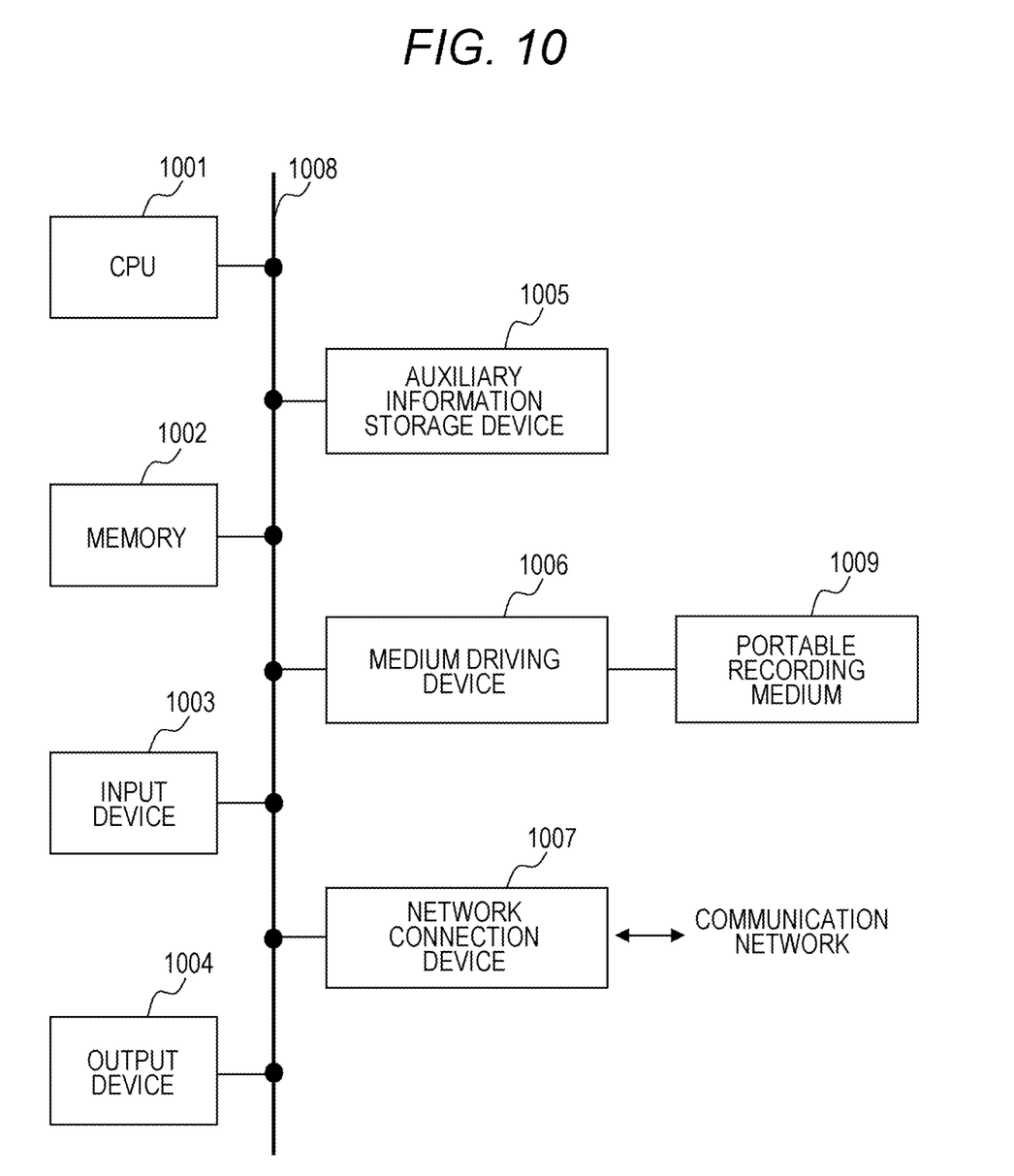
FIG. 10 is a diagram illustrating a configuration example of a hardware of a computer capable of realizing a device according to an embodiment.

FIG. 10 is a diagram illustrating an example of a hardware configuration of a computer capable of realizing the motion vector calculation/noise removal device 100 of FIG. 1. This computer includes a personal computer, a smartphone, a tablet terminal, a digital camera, and the like. The computer illustrated in FIG. 10 includes a central processing unit (CPU) 1001, a memory 1002, an input device 1003, an output device 1004, an auxiliary information storage device 1005, a medium driving device 1006 into which a portable recording medium 1009 is inserted, and a network connection device 1007. These components are connected to one another by a bus 1008. The configuration illustrated in FIG. 10 is an example of a computer capable of realizing the motion vector calculation/noise removal device 100 described above, and such a computer is not limited to this configuration.

The memory 1002 is a semiconductor memory such as a read only memory (ROM), a random access memory (RAM), or a flash memory, and stores a program and data used for processing.

By executing a program corresponding to, for example, processing of the flowcharts in FIGS. 8 and 9, used in the motion vector calculation/noise removal device 100 of FIG. 1, for example, using the memory 1002, the CPU (processor) 1001 operates as each processing block illustrated in FIG. 1.

The input device 1003 is, for example, a keyboard, a pointing device or the like, and is used for inputting an instruction from an operator or a user or information. The output device 1004 is, for example, a display device, a printer, a speaker or the like, and is used for inquiring to an operator or a user or outputting a processing result.

The auxiliary information storage device 1005 is, for example, a hard disk storage device, a magnetic disk storage device, an optical disk device, a magneto-optical disk device, a tape device, or a semiconductor storage device, and operates, for example, as the memory 1002 illustrated in FIG. 10. The motion vector calculation/noise removal device 100 of FIG. 1 may store a program and data for executing, for example, the processing of the flowcharts in FIGS. 8 and 9, used in the motion vector calculation/noise removal device 100 of FIG. 1 in the auxiliary information storage device 1005, and may load the program and data into the memory 1002 for use.

The medium driving device 1006 drives the portable recording medium 1009 and accesses recorded contents of the portable recording medium 1009. The portable recording medium 1009 is a memory device, a flexible disk, an optical disk, a magneto-optical disk, or the like. The portable recording medium 1009 may be a compact disk read only memory (CD-ROM), a digital versatile disk (DVD), a universal serial bus (USB) memory, or the like. An operator or a user may store the above-described program and data in the portable recording medium 1009, and may load the program and data into the memory 1002 for use.

As described above, the computer-readable recording medium for storing the above-described program and data is a physical (non-transitory) recording medium such as the memory 1002, the auxiliary information storage device 1005, or the portable recording medium 1009.

The network connection device 1007 is a communication interface which is connected to a communication network such as local area network (LAN) and performs data conversion accompanying communication. The motion vector calculation/noise removal device 100 of FIG. 1 may receive the above-described program or data from an external device via the network connection device 1007, and may load the program or data into the memory 1002 for use.

Note that it may be possible for the motion vector calculation/noise removal device 100 of FIG. 1 to include not all of the components of FIG. 10, and it may also be possible to omit a part of the components according to an application or conditions. For example, in a case where an instruction from an operator or a user or information does not have to be input, the input device 1003 may be omitted. In a case where the portable recording medium 1009 or a communication network is not used, the medium driving device 1006 or the network connection device 1007 may be omitted.

Hitherto, the disclosed embodiment and advantages thereof have been described in detail. A person skilled in the art can make various changes, additions, and omissions without departing from the scope of the present invention specifically described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A motion vector calculation method for calculating a motion vector of a pixel between image frames included in a moving image or a still image group photographed continuously, comprising:

generating, by a computer, a plurality of resolution images corresponding to a plurality of resolutions, respectively, from each of a target image which is an image frame of a processing target among the image frames and a processing target image which is an image frame photographed before the target image, executing block matching between a resolution image of the target image and a resolution image of the processing target image for each of the resolutions, calculating a plurality of motion vector candidates corresponding to the respective resolutions for each pixel of the target image, evaluating reliability of the plurality of motion vector candidates based on an evaluation index using noise characteristics related to pixel areas of a start point and an end point of each of the plurality of motion vector candidates for each pixel of the target image, and calculating a final motion vector, wherein processing of the evaluating the reliability includes processing of calculating a structural image and a detailed image by bilateral filter processing from each of a patch of a target block of the target image and a patch of a block corresponding to each of the motion vector candidates, compositing the structural images of the patch of the target block of the target image and the patch of the block corresponding to each of the motion vector candidates to calculate a composite structural image, compositing the detailed images of the patch of the target block of the target image and the patch of the block corresponding to each of the motion vector candidates to calculate a composite detailed image, and evaluating the reliability of the motion vector candidates based on a standard deviation or variance of noise indicated by the composite detailed image.

2. The motion vector calculation method according to claim 1, wherein processing of the evaluating the reliability includes processing of determining a matching degree indicating whether a number of the motion vector candidates indicating substantially the same place among the plurality of motion vector candidates is equal to or larger than a predetermined threshold.

3. The motion vector calculation method according to claim 1, wherein processing of the evaluating the reliability includes processing of calculating a backward motion vector candidate indicating movement from the target image targeting a movement source of one of the plurality of motion vector candidates to the processing target image, and determining a matching degree between the one of plurality of the motion vector candidates and the backward motion vector candidate.

4. The motion vector calculation method according to claim 1, wherein the processing of the evaluating the reliability further includes processing of evaluating the reliability of the motion vector candidates based on an absolute value of a difference between an average value of pixel values of a structural image corresponding to the patch of the target block of the target image and an average value of pixel values of the composite structural image.

5. The motion vector calculation method according to claim 1, further comprising:

removing noise between image frames by calculating an addition average of corresponding pixels between the image frames while correcting a positional deviation caused by change with time using the motion vectors.

6. An information processing apparatus comprising:
a memory; and
a processor coupled to the memory and configured to perform processing of:

generating a plurality of resolution images corresponding to a plurality of resolutions, respectively, from each of a target image which is an image frame of a processing target among image frames included in a moving image or a still image group photographed and a processing target image which is an image frame photographed before the target image;

executing block matching between a resolution image of the target image and a resolution image of the processing target image for each of the resolutions;

calculating a plurality of motion vector candidates corresponding to the respective resolutions for each pixel of the target image;

evaluating reliability of the plurality of motion vector candidates based on an evaluation index using noise characteristics related to pixel areas of a start point and an end point of each of the plurality of motion vector candidates for each pixel of the target image; and calculating a motion vector based on the reliability of the plurality of motion vector candidates, wherein the processing of the evaluating the reliability includes processing of calculating a structural image and a detailed image by bilateral filter processing from each of a patch of a target block of the target image and a patch of a block corresponding to each of the motion vector candidates, compositing the structural images of the patch of the target block of the target image and the patch of the block corresponding to each of the motion vector candidates to calculate a composite structural image, compositing the detailed images of the patch of the target block of the target image and the patch of the block corresponding to each of the motion vector candidates to calculate a composite detailed image, and evaluating the reliability of the motion vector candidates based on a standard deviation or variance of noise indicated by the composite detailed image.

7. The information processing apparatus according to claim 6, wherein the processing of the evaluating the reliability includes processing of determining a matching degree indicating whether a number of the motion vector candidates indicating substantially the same place among the plurality of motion vector candidates is equal to or larger than a predetermined threshold.

8. The information processing apparatus according to claim 6, wherein the processing of the evaluating the reliability includes processing of calculating a backward motion vector candidate indicating movement from the target image targeting a movement source of one of the plurality of motion vector candidates to the processing target image, and determining a matching degree between the one of plurality of the motion vector candidates and the backward motion vector candidate.

9. The information processing apparatus according to claim 6, wherein the processing of the evaluating the reliability further includes processing of evaluating the reliability of the motion vector candidates based on an absolute value of a difference between an average value of pixel values of a structural image corresponding to the patch of the target block of the target image and an average value of pixel values of the composite structural image.

10. The information processing apparatus according to claim 6, wherein the processing includes: removing noise between image frames by calculating an addition average of corresponding pixels between the image frames while correcting a positional deviation caused by change with time using the motion vectors.

11. A non-transitory computer-readable recording medium recording a motion vector calculation program for causing a computer to perform a process, the process comprising:

generating a plurality of resolution images corresponding to a plurality of resolutions, respectively, from each of a target image which is an image frame of a processing target among image frames included in a moving image or a still image group photographed continuously and a processing target image which is an image frame photographed before the target image;

executing block matching between a resolution image of the target image and a resolution image of the processing target image for each of the resolutions;

calculating a plurality of motion vector candidates corresponding to the respective resolutions for each pixel of the target image;

evaluating reliability of the plurality of motion vector candidates based on an evaluation index using noise characteristics related to pixel areas of a start point and an end point of each of the plurality of motion vector candidates for each pixel of the target image; and calculating a motion vector based on the reliability of the plurality of motion vector candidates, wherein processing of the evaluating the reliability includes processing of calculating a structural image and a detailed image by bilateral filter processing from each of a patch of a target block of the target image and a patch of a block corresponding to each of the motion vector candidates, compositing the structural images of the patch of the target block of the target image and the patch of the block corresponding to each of the motion vector candidates to calculate a composite structural image, compositing the detailed images of the patch of the target block of the target image and the patch of the block corresponding to each of the motion vector candidates to calculate a composite detailed image, and evaluating the reliability of the motion vector candidates based on a standard deviation or variance of noise indicated by the composite detailed image.

12. The non-transitory computer-readable recording medium according to claim 11, wherein processing of the evaluating the reliability includes processing of determining a matching degree indicating whether a number of the motion vector candidates indicating substantially the same place among the plurality of motion vector candidates is equal to or larger than a predetermined threshold.

13. The non-transitory computer-readable recording medium according to claim 11, wherein processing of the evaluating the reliability includes processing of calculating a backward motion vector candidate indicating movement from the target image targeting a movement source of one of the plurality of motion vector candidates to the processing target image, and determining a matching degree between the one of plurality of the motion vector candidates and the backward motion vector candidate.

14. The non-transitory computer-readable recording medium according to claim 11, wherein the processing of the evaluating the reliability further includes processing of evaluating the reliability of the motion vector candidates based on an absolute value of a difference between an average value of pixel values of a structural image corresponding to the patch of the target block of the target image and an average value of pixel values of the composite structural image.

15. The non-transitory computer-readable recording medium according to claim 11, further comprising: removing noise between image frames by calculating an addition average of corresponding pixels between the image frames while correcting a positional deviation caused by change with time using the motion vectors.

* * * * *